United States Patent Office 3,733,208
Patented May 15, 1973

3,733,208
PRODUCTION OF BAKERY PRODUCTS
Shigehiko Sato, Osaka, and Saburo Yamatodani, Minoo, Japan, assignors to Takeda Chemical Industries, Ltd., Higashi-ku, Osaka, Japan
No Drawing. Filed Feb. 5, 1970, Ser. No. 9,039
Claims priority, application Japan, Feb. 5, 1969, 44/8,514
Int. Cl. A21d 2/18
U.S. Cl. 99—90 R    24 Claims

ABSTRACT OF THE DISCLOSURE

Uniform incorporation of microbial heteropolysaccharides comprising hexose and succinic acid produced by e.g. *Archromobacter lactolyticus* into doughs for bakery products enhances the stability of the doughs, makes the doughs susceptible to mechanical treatment with less trouble, significantly increases weight and specific volume of bakery products and also considerably prevents the bakery products from staling and retrogradation on storage.

---

The present invention relates to improvement in production of bakery products. More particularly, the present invention relates to a method for improving the quality of bakery products by employing heteropolysaccharides, which satisfy specific characteristics as detailed below.

To retard the staling of bakery products such as breads, sweet doughs and cakes, or otherwise upgrading them, it has heretofore been common practice in bakeries to uniformly add into doughs such surfactants as monoglyceride, sucrose fatty acid esters, sorbitan fatty acid esters, stearyl lactylates and the like.

However, none of known improving agents has satisfactorily resolved the desideratum in the baking industries.

That is, development of large-scale distribution of bakery products has fostered the demand for quality products having improved keeping qualities, i.e. products free from staling on prolonged storage. Furthermore, mechanization in the baking industry has made the mixing stability a major consideration. However, no satisfactory solutions to these problems have yet been found.

The present inventors have unexpectedly found that the incorporation of the microbial heteropolysaccharides falling in a category which is characterized by the specific properties as described hereinafter, in doughs for the bakery products enhances the stability of the doughs, makes the doughs to be mechanically treated with less trouble, significantly increases weight and specific volume of the bakery products, especially of breads, and also considerably prevents the bakery products from staling and retrogradation on storage.

It is an object of the present invention to provide an industrially feasible method for improving quality of bakery products. Another object of the present invention is to provide a farinaceous composition as well as a dough composition, both of which can be employed as very excellent premixes in the baking industry.

The microbial heteropolysaccharides to be employed as the bakery product improving agent in the method of the present invention are those falling in a category which is characterized by the following properties:

The heteropolysaccharides substantially consist of hexose and succinic acid. The weight ratio of the hexose and succinic acid is about 85–95:5–15 in terms of their free form. The main unit of the hexose is glucose and the hexose contains 0 to about 20% of galactose unit relative to its total units;

The heteropolysaccharides show the following significant absorption bands in infrared absorption spectrum with KBr disc method: about 3400(s.), about 2930(m.), about 1740(m.), about 1490–about 1360(m.), about 905–about 890(w.) and about 830–about 810(w.) cm.$^{-1}$;

The heteropolysaccharides are stable and show substantially fixed viscosity in a pH range of from 1 to 11 in Sörensen buffer solution adjusted with Michaelis buffer solution;

The heteropolysaccharides are positive to Indole-Sulfuric Acid Test and Anthrone Test, and negative to Resorcine Test, Molisch Test, Naphthoresorcine Test, α-Naphthol Test and Ninhydrin Test;

The heteropolysaccharides are not hydrolyzed by amylase and cellulase;

An average molecular weight calculated according to Mandelkern and Flory's equation of the heteropolysaccharides is from about 15,000 to about 1,000,000; and The heteropolysaccharides show a high viscosity. For instance, the viscosity of their 1% aqueous solution is higher than about 5,000 centipoises.

The said heteropolysaccharides may be obtained by incubating a microorganism. Preferred examples of such heteropolysaccharide-producing microorganism there may be enumurated microorganisms belonging to the genus Achromobacter. Most advantageous production of the heteropolysaccharides may be attained by, for example, incubating *Archomobacter lactolyticus*.

Microbiological properties of *Achromobacter lactolyticus* are the same as those of *Achromobacter superficialis* except the following differences:

|  | *Achromobacter lactolyticus* | *Achromobacter superficialis* |
|---|---|---|
| 1. Gelatin stab: |  |  |
|   Growth | Best at tops | Slightly at top. |
|   Liquefaction | − | + |
| 2. Potate plut: Growth | + | − |
| 3. Nutrient broth: Ring or thin pellicle. | + | − |
| 4. Litmus milk: Peptonization | + | − |
| 5. Action on nitrate | + | − |

For the purpose of the industrial production of the heteropolysaccharide by incubating a heteropolysaccharide-producing microorganism, it is generally preferable to use a liquid culture medium.

Generally, the incubation is carried out either under static conditions or in a submerged process under aeration and/or agitation, employing a culture medium containing both assimilable carbon source(s) and digestible nitrogen source(s).

As the assimilable carbon source, there may be advantageously employed one or more of glucose, sucrose, maltose, fructose, lactose, inositol, mannitol, galactose, xylose, acetic acid, fumaric acid, lactic acid, and the like.

As the digestible nitrogen source, preferable use is made of one or more of yeast extract, casein hydrolysate, corn steep liquor, malt extract, sodium nitrate, potassium nitrate, ammonium nitrate, ammonium dihydrogen-phosphate, diammonium hydrogenphosphate, ammonium sulfate and the like.

Furthermore, a small quantity of inorganic salts such as disodium hydrogenphosphate, potassium dihydrogenphosphate, magnesium sulfate, potassium chloride, ferric sulfate, manganese chloride and the like may be added to the medium.

Incubation conditions such as the pH of the medium and the incubation temperature should be controlled so as to produce the heteropolysaccharide in the maximum amount. Generally, the initial pH of the culture medium and the incubation temperature are respectively adjusted to about 6– about 8 and to about 25° C.–45° C.

Although the period required for the maximum accumulation of the heteropolysaccharide is changeable depending upon various factors, the amount of the heteropolysaccharide accumulated in the culture broth reaches a maximum usually between 40 hours to 120 hours from the start of the incubation.

Generally-known means for recovering polysaccharides from the culture broth containing them can be applied to the recovery of the heteropolysaccharide of the present invention from the culture broth. The heteropolysaccharide can be adsorbed on various adsorbents, or precipitated by some precipitants. Moreover, conventional means for recovery such as salting out or dialysis, or a combination thereof, may be employed for the purpose of recovery and purification.

Practically, the culture broth is diluted with water to lessen its viscosity and then subjected to filtration, with or without employment of a filter aid to remove microorganism cells. The filtrate is subjected to spray drying or drum drying to give crude heteropolysaccharide. Alternatively, the said filtrate is concentrated to about one-tenth or one-twentieth volume, and to the concentrate is added about equivolume to 2.5-fold volume of acetone or about 1.5- to 4-fold volume of ethyl alcohol, whereby the crude heteropolysaccharide is precipitated. It is advantageous to add a small amount of sodium chloride in combination with the acetone or the ethyl alcohol.

Furthermore, it is possible to separate the heteropolysaccharide directly from the diluted culture broth, for example, by salting out at about 30 to 60% saturation with ammonium sulfate.

Though thus-obtained crude heteropolysaccharide may be employed as it is for the purpose of the present invention, the crude heteropolysaccharide may further be purified. The purification may be carried out by, for example, further subjecting the crude heteropolysaccharide to dialysis and then to the above-mentioned treatments with acetone, ethyl alcohol and/or ammonium sulfate.

For the purpose of the present invention, one or more of thus-obtained heteropolysaccharides may be employed as in a free form or as a physiologically acceptable salt such as alkali metal salt, e.g. sodium salt, potassium salt; alkaline earth metal salt, e.g. calcium salt, magnesium salt.

As mentioned above, the crude heteropolysaccharide may be employed as it is. It is advantageous to employ a crude composition, whose hexose content is not less than about 65%, preferably not less than about 80%, relative to the whole weight.

The method of the present invention is applicable to any bakery products to be prepared by cooking on heating (i.e. baking, frying, and/or steaming) in the baking industry. That is to say, the term "the bakery products" in the present specification as well as in claims is to be understood as implying yeast-leavened bakery products, chemically leavened bakery products, air leavened bakery products and unleavened bakery products. In other words, the flour as the main raw material of the bakery products may be wheat flour, rye flour, a mixture of starch and protein, or mixtures thereof. Thus, "the bakery products" in the present invention comprises so-called "starch breads" or "non-wheat breads" such as cassava-soy breads, cassava-peanut flour breads, corn-soy breads, corn-casava-soy breads, yam-soy breads and the like.

As typical examples of the bakery products there may be counted white breads, rye breads, sweet doughs, cakes, biscuits, cookies, friend pies, so-called "starch breads" or "non-wheat breads", steamed doughs and the like.

According to the method of the present invention, the heteropolysaccharide is uniformly incorporated in the doughs and then the doughs are subjected to the cooking. Preferable amount of the heteropolysaccharide is from about 0.05 to about 1%, most advantageously from about 0.1 to about 0.5%, by weight relative to the weight of the flour contained in the doughs.

Practically, the incorporation of the heteropolysaccharide in the doughs is carried out either by previously admixing the heteropolysaccharide with the flour to obtain a farinaceous composition and preparing a dough from said composition, or adding the heteropolysaccharide directly or as an aqueous solution or suspension in preparing a dough. The term "dough" in this connection is to be understood as including so-called "sponge" and so-called "batter."

Thus-obtained doughs containing the heteropolysaccharide is remarkably excellent in its water absorption, stability and mechanical resistance as compared with ordinary doughs and such dough-improving effect is not attainable even when guar gum is employed (see Test 1).

The dough comprising the heteropolysaccharide is subjected to the cooking on heating to give bakery products with improved quality. For example, thus obtained breads are remarkably increased in specific volume and weight and can be significantly prevented from staling and retrogradation on prolonged storage as compared with ordinary breads, while such excellent improving effects cannot be attained with the employment of monoglyceride (see Tests 2 and 3).

The heteropolysaccharide may be employed in combination with one or more of known improving agents.

The following references illustrate the typical production of the heteropolysaccharides that are used in the present invention. Throughout this specification, parts by volume bear the same relationship to parts by weight as do milliliters to grams. "ATCC No." in References indicates an accession number of American Type Culture Collection, Rockville, Md.

REFERENCE 1

*Achromobacter lactolyticus* (ATCC No. 21473) is incubated into 100 parts by volume of an aqueous medium comprising 5% glucose, 0.2% of sodium nitrate, 0.05% of potassium dihydrogenphosphate, 0.05% of disodium hydrogenphosphate, 0.05% of magnesium sulfate and 0.05% of potassium chloride (pH 6.8) and the medium is incubated under shaking at 30° C. for 72 hours to give culture broth of a high viscosity.

To the culture broth is added 700 parts by volume of water and the mixture is subjected to centrifuge at 21,000 g. for 60 minutes. To the supernatant is added sodium chloride to make its concentration 0.5% relative to the whole volume. To the mixture is added 95% ethyl alcohol in twice volume and the mixture is stirred, whereby heteropolysaccharide is precipitated. The precipitates collected are washed with acetone and then dried under reduced pressure to give the crude heteropolysaccharide.

Thus-obtained crude heteropolysaccharide is dissolved in water to prepare a 0.2% aqueous solution. The solution is subjected to centrifugation at 40,000 g. for 60 minutes. To the supernatant are added firstly sodium chloride to make its concentration 0.5% and subsequently ethyl alcohol to make its concentration 65% relative to the whole volume, whereby the heteropolysaccharide is precipitated. The heteropolysaccharide collected is dissolved in water to prepare a 0.2% aqueous solution. The solution is subjected to gel-filtration with employment of a column packed with Sephadex G-100 (trade name of dextran particles for gel-filtration, sold by Uppsala Co., Sweden). Fractions containing the objective heteropolysaccharides are combined. Thus-obtained solution is again treated with sodium chloride and ethyl alcohol in the same conditions as mentioned just above to give precipitates. The precipitates are dissolved in distilled water and subjected to dialysis with distilled water for 4 days.

Thus-obtained solution is divided into four portions and the respective solutions are subjected to one of the following treatments:

(a) To 100 parts by volume of the solution is added 1 part by weight of Amberlite IR-120 H( type). The mixture is stirred for 4 hours and subjected to filtration. The filtrate was subjected to dialysis in water and lyophilized to give free form of heteropolysaccharide (hereinafter referred to as "Heteropolysaccharide Preparation 1a").

(b) To the solution are added firstly sodium hydroxide, calcium hydroxide or magnesium hydroxide to make its concentration 1% and are added three times ethyl alcohol to make its concentration 65% relative to the whole volume, whereby sodium salt, calcium salt or magnesium salt of heteropolysaccharide is precipitated (hereinafter referred to as "Heteropolysaccharide Preparation 1b," "Heteropolysaccharide Preparation 1c" and "Heteropolysaccharide Preparation 1d," respectively").

Thus-obtained Heteropolysaccharide Preparations show the following viscosity at their 1% aqueous solutions.

| Heteropolysaccharide Preparation: | Viscosity of 1% aqueous solution (centipoises) |
|---|---|
| Preparation 1a | $5 \times 10^4$ |
| Preparation 1b | $2 \times 10^4$ |
| Preparation 1c | $2 \times 10^8$ |
| Preparation 1d | $2 \times 10^8$ |

REFERENCE 2

*Achromobacter lactolylticus* (ATCC No. 21473) is inoculated into 100 parts by volume of an aqueous medium of the same composition as described in Reference 1 and the medium is incubated under shaking at 30° C. for 72 hours to give culture broth of a high viscosity.

To the culture broth is added 400 parts by volume of water and the mixture is subjected to centrifuge to remove cells. The resulting supernatant is salted out with ammonium sulfate at 38% saturation to give crude heteropolysaccharide.

The crude heteropolysaccharide is subjected to dialysis with water to remove ammonium sulfate remaining in it. To thus obtained aqueous solution of the heteropolysaccharide there are added acetone and sodium chloride to make their respective concentrations 70% and 2% relative to the whole volume, whereby the heteropolysaccharide is completely precipitated. The precipitates collected by filtration are dehydrated with acetone and dried under reduced pressure to give 1.15 parts by weight of heteropolysaccharide as white fibrous powder (hereinafter referred to as "Heteropolysaccharide Preparation 2").

REFERENCE 3

*Achromobacter lactolyticus* (ATCC No. 21473) is inoculated into 100 parts by volume of an aqeous medium comprising 5% of glucose, 0.5% of yeast extract, 0.1% of diammonium hydrogenphosphate, 0.1% of potassium dihydrogenphosphate and 0.05% of magnesium sulfate and the medium is incubated under shaking at 28° C. for 96 hours to give culture broth of a high viscosity.

To the culture broth is added 500 parts by volume of water and the mixture is filtered with the employment of a filter aid to remove cells. The filtrate is concentrated under reduced pressure to about one-fifth volume of its original volume. To the concentrate is added acetone to make its final concentration 70% relative to the whole volume, whereby the heteropolysaccharide is precipitated. The precipitates collected by filtration are dehydrated with acetone and dried under reduced pressure to give 1.52 parts by weight of heteropolysaccharide as white fibrous powder (hereinafter referred to as "Heteropolysaccharide Preparation 3").

The following tests and examples are merely intended to demonstrate the effects of the present invention. In examples "parts" is intended to mean "parts by weight."

TEST 1

Flour A: Wheat flour

Flour B: A mixture of the wheat flour and 0.5% by weight of guar gum relative to the weight of the wheat flour.

Flour C: A mixture of the wheat flour and 0.3% by weight of the Heteropolysaccharide Preparation 2 relative to the weight of the wheat flour.

Rheological properties of the respective doughs made from Flours A to C were measured employing Brabender Farinograph.

The results are summarized in Table 1.

TABLE 1

| Flour | Water absorption, percent | Valorimeter value |
|---|---|---|
| A | 69.6 | 72 |
| B | 68.5 | 71 |
| C | 72.1 | 77 |

TEST 2

Control Dough A: Control Dough A was prepared in the recipe listed as Table 2 by the sponge and dough method in which the sponge dough was fermented at 24° C. for 4 hours and the dough obtained by the dough stage was fermented at 29° C. for 40 minutes.

TABLE 2

| | The sponge stage (gram) | The dough stage (gram) |
|---|---|---|
| Wheat flour | 70 | 30 |
| Yeast | 2 | |
| Sugar | | 4 |
| Table salt | | 1.7 |
| Shortening | | 4 |
| Water | 38 | 25.5 |

Dough A: Dough A was prepared in the same recipe and manner as Control Dough A except the following points:

(1) Heteropolysaccharide Preparation 2 was added in an amount of 0.3% by weight relative to the total weight of the wheat flour (the sum of the amounts of the flour added in the sponge stage and the dough stage) in the sponge stage.

(2) The amount of water absorbed by Dough A in the dough-preparing process was about 2% larger than that of Control Dough A (in other words, the amount of water used in the test recipe was increased about 2% over the control recipe).

Control Dough A and Dough A were subjected to makeup, i.e. dividing, rounding, moulding and proofing for 40 minutes and then baked at 200° C. for 20 minutes to give white bread loaves.

The weight and volume of each loaf from the respective doughs were measured and the respective loaves were subjected to sensory tests according to the Bread Score Method.

The results are shown in Table 3 and Table 4, respectively.

TABLE 3

| | Bread from Control Dough A | Bread from Dough A |
|---|---|---|
| Average weight of a loaf (gram) | 142.5 | 144.5 |
| Average volume of a loaf (milliliter) | 705 | 765 |
| Specific volume (milliliter/gram) | 4.95 | 5.29 |

TABLE 4 (BREAD SCORE)

| | | Sample score | |
|---|---|---|---|
| | Perfect score | Bread from Control Dough A | Bread from Dough A |
| Volume | 10 | 8.75 | 9.38 |
| Color of crust | 8 | 7.00 | 7.25 |
| Symmetry of form | 5 | 4.37 | 4.53 |
| Evenness of bake | 3 | 2.60 | 2.60 |
| Character of crust | 4 | 3.50 | 3.63 |
| Break and shred | 15 | 13.13 | 13.59 |
| Color of crumb | 10 | 8.75 | 9.05 |
| Aroma | 10 | 8.75 | 8.75 |
| Taste | 20 | 17.52 | 17.52 |
| Texture | 15 | 14.05 | 14.05 |
| Total score | 100 | 88.4 | 90.4 |

Each bread was stored at a room temperature for 72 hours and change of crumb softness was determined at 24, 48 and 72 hours storage.

The crumb softness was measured as the stress required to compress a 5 cm. x 5 cm., 20 mm.-thick slice of bread into a 2 mm.-thick slice on the Baker Compressimeter.

The number of grams in Table 5 is the average of data for 10 slices of each bread.

TABLE 5

| | Storage period of— | | |
|---|---|---|---|
| | 24 hr. | 48 hr. | 72 hr. |
| Bread from Control Dough A, g | 68 | 93 | 151 |
| Bread from Dough A, g | 53 | 83 | 144 |

As is clear from Table 5, bread from Dough A shows a far lower degree of crumb hardening than that of bread from Control Dough A, which means that the heteropolysaccharide of the present invention effectively prevents the bread from becoming stale.

TEST 3

Control Dough B was prepared in the recipe as Table 6 by the sponge and dough method after the manner described in Test 2.

TABLE 6

| | The sponge stage (gram) | The dough stage (gram) |
|---|---|---|
| Wheat flour | 70 | 30 |
| Yeast | 2 | |
| Sugar | | 4 |
| Table salt | | 1.7 |
| Shortening | | 4 |
| Water | 38 | 25.5 |

Dough B, Dough C and Dough D were, respectively, prepared in the same recipe and manner as Control Dough B execpt the addition of the following additives in the sponge stage (the percent is based on the total weight of the wheat flour):

Dough B: 0.3% by weight of Heteropolysaccharide Preparation 2.

Dough C: 0.5% by weight of monoglyceride (Emalusy MB sold by Takeda Chemical Industries, Ltd., Osaka Japan).

Dough D: 0.3% by weight of Heteropolysaccharide Preparation 2 plus 0.5% by weight of the monoglyceride.

The amount of water absorbed by Doughs B and D in the dough-preparing process was about 2% larger than that of Control Dough B.

Each dough was subjected to make-up, proofing and then baked under just the same conditions as described in Test 2 to give white bread loaves.

The weight and volume of each loaf from the respective doughs were measured. The results are summarized in Table 7.

TABLE 7

| | Bread from Control Dough B | Bread from Dough B | Bread from Dough C | Bread from Dough D |
|---|---|---|---|---|
| Average weight of a loaf (gram) | 138 | 140 | 139 | 142 |
| Average volume of a loaf (milliliter) | 727 | 785 | 730 | 792 |
| Specific volume (milliliter/gram) | 5.27 | 5.61 | 5.25 | 5.58 |

Each bread was stored at a room temperature for 72 hours and change of crumb softness was determined at 24, 48 and 72 hours storage after the manner described in Test 2. The numbers of grams in Table 8 show the average of data for 10 slices of each bread.

TABLE 8

| | Storage period of— | | |
|---|---|---|---|
| | 24 hr. | 48 hr. | 72 hr. |
| Bread from Control Dough B, g | 80.1 | 143.8 | 201.7 |
| Bread from Dough B, g | 61.2 | 112.2 | 170.0 |
| Bread from Dough C, g | 57.8 | 104.9 | 150.8 |
| Bread from Dough D, g | 49.7 | 93.8 | 130.2 |

Example 1

Formula:                                            Parts
  Wheat flour _____ 100
  Compressed yeast _____ 2
  Table salt _____ 2
  Shortening _____ 4
  Yeast food _____ 0.1
  Heteropolysaccharide Preparation 2 _____ 0.3
  Water _____ 62

Dough is prepared from the above ingredients by the sponge and dough method, and the resulting dough is subjected to make-up, proofing and baking to give white bread loaves with improved quality.

Example 2

Formula:                                            Parts
  Rye flour _____ 100
  Fresh sour _____ 6
  Compressed yeast _____ 0.8
  Table salt _____ 1.5
  Heteropolysaccharide Preparation 1c _____ 0.3
  Water _____ 95

Dough is prepared from the above ingredients by the sponge and dough method, and the resulting dough is subjected to make-up, proofing and baking to give pumper-nickel (rye bread) with improved quality.

Example 3

Formula:                                            Parts
  Wheat flour _____ 150
  Sugar _____ 40
  Egg _____ 50
  Baking powder _____ 1.5
  Heteropolysaccharide Preparation 1a _____ 0.3
  Water _____ 100

Dough is prepared from the above ingredients and the resulting dough is subjected to make-up and steaming for 15 minutes to give steamed dough (mushipan in Japanese) with improved quality.

Example 4

Formula:                                            Parts
  Wheat flour _____ 100
  Baking powder _____ 1
  Butter _____ 30
  Egg _____ 24
  Sugar _____ 30
  Heteropolysaccharide Preparation 3 _____ 0.3

Dough is prepared from the above ingredients and the resulting dough is subjected to make-up and baked at about 160° C. for 10 minutes to give cookies with improved quality.

Example 5

Formula:                                            Parts
  Corn starch _____ 87
  Wheat gluten _____ 13
  Compressed yeast _____ 2
  Table salt _____ 2
  Sugar _____ 2
  Shortening _____ 2
  A 10% aqueous emulsion of Emalusy MB ____ 10
  Water _____ 61
  Heteropolysaccharide Preparation 1b _____ 0.3

Dough is prepared from the above ingredients, and the resulting dough is subjected to make-up, proofing and baking to give corn-gluten bread with improved quality.

What is claimed is:

1. A method for improving the quality of a bakery product which comprises uniformly incorporating into the dough of such product prior to cooking a microbial heteropolysaccharide, the amount of the heteropolysaccharide being from about 0.05 to about 1% by weight relative to the weight of flour in the dough and the heteropolysaccharide having the following characteristics:

(1) it substantially consists of hexose and succinic acid in a weight ratio of about 85–95 to about 5–15 in terms of their free form, the main unit of the hexose being glucose unit and the hexose containing 0 to about 20% of galactose unit relative to the total units;

(2) it shows significant infrared absorption bands in KBr disc at the wave numbers in cm.$^{-1}$ of about 3400 (s.), about 2930 (m.), about 1740 (m.), about 1490–about 1360 (m.), about 905–about 890 (w.) and about 830–about 810 (w.);

(3) it is stable and shows substantially fixed viscosity in a pH range of from 1 to 11 in Sorensen buffer solution adjusted with Michaelis buffer solution;

(4) it is positive to Indole-Sulfuric Acid Test and Anthrone Test, and is negative to Resorcine Test, Molisch Test, Naphthoresorcine Test, α-Naphthol Test and Ninhydrin Test; and (5) it is not hydrolyzed by amylase and cellulase.

2. A method according to claim 1, wherein the flour is wheat flour.

3. A method according to claim 1, wherein the flour is rye flour.

4. A method according to claim 1, wherein the flour is a mixture of starch and protein.

5. A method according to claim 1, wherein the amount of the heteropolysaccharide is from about 0.1 to about 0.5% by weight relative to the weight of the flour.

6. A method according to claim 1, wherein the heteropolysaccharide is employed in a crude composition having a hexose amount of not less than about 65% relative to the whole weight.

7. A method according to claim 1, wherein the heteropolysaccharide is one produced by the incubation of *Achromobacter lactolyticus* (ATCC No. 21473).

8. A method according to claim 1 wherein the heteropolysaccharide is one produced by the incubation of *Achromobacter lactolyticus*.

9. A farinaceous composition which comprises flour in intimate admixture with a microbial heteropolysaccharide in an amount of from about 0.05 to about 1% by weight relative to the weight of the flour, the heteropolysaccharide having the following characteristics:

(1) it substantially consists of hexose and succinic acid in a weight ratio of about 85–95 to about 5–15 in terms of their freee form, the main unit of the hexose being glucose unit and the hexose containing 0 to about 20% of galactose unit relative to the total units;

(2) it shows significant infrared absorption bands in KBr disc at the wave numbers in CM$^{-1}$ of about 3400 (s.), about 2930 (m.), about 1740 (m.), about 1490–about 1360 (m.), about 905–about 890 (w.) and about 830–about 810 (w.);

(3) it is stable and shows substantially fixed viscosity in a pH range of from 1 to 11 in Sörensen buffer solution adjusted with Michaelis buffer solution;

(4) it is positive to Indole-Sulfuric Acid Test and Anthrone Test, and is negative to Resorcine Test, Molisch Test, Naphthoresorcine Test, α-Naphthol Test and Ninhydrin Test; and (5) it is not hydrolyzed by amylase and cellulase.

10. A farinaceous composition according to claim 9, wherein the flour is wheat flour.

11. A farinaceous composition according to claim 9, wherein the flour is rye flour.

12. A farinaceous composition according to claim 9, wherein the flour is a mixture of starch and protein.

13. A farinaceous composition according to claim 9, wherein the amount of the heteropolysaccharide is from about 0.1 to about 0.5% by weight relative to the weight of the flour.

14. A farinaceous composition according to claim 9, wherein the heteropolysaccharide is a crude composition having hexose of not less than about 65% relative to the whole weight.

15. A farinaceous composition according to claim 9, wherein the heteropolysaccharide is one produced by the incubation of *Achromobacter lactolyticus* (ATCC No. 21473).

16. A farinaceous composition according to claim 9 wherein the heteropolysaccharide is one produced by the incubation of *Achromobacter lactolyticus*.

17. A dough composition which comprises flour and water in intimate admixture with a microbial heteropolysaccharide in an amount of from about 0.05 to about 1% by weight relative to the weight of the flour, the heteropolysaccharide having the following characteristics:

(1) it substantially consists of hexose and succinic acid in a weight ratio of about 85–95 to about 5–15 in terms of their free form, the main unit of the hexose being glucose unit and the hexose containing 0 to about 20% of galactose unit relative to the total units;

(2) it shows significant infrared absorption bands in KBr disc at the wave numbers in CM$^{-1}$ of about 3400 (s.), about 2930 (m.), about 1740 (m.), about 1490–about 1360 (m.), about 905–about 890 (w.), and about 830–about 810 (w.);

(3) it is stable and shows substantially fixed viscosity in a pH range of from 1 to 11 in Sörensen buffer solution adjusted with Michaelis buffer solution;

(4) it is positive to Indole-Sulfuric Acid Test and Anthrone Test, and is negative to Resorcine Test, Molisch Test, Naphthoresorcine Test, α-Naphthol Test and Ninhydrin Test; and (5) it is not hydrolyzed by amylase and cellulase.

18. A dough composition according to claim 17, wherein the flour is wheat flour.

19. A dough composition according to claim 17, wherein the flour is rye flour.

20. A dough composition according to claim 17, wherein the flour is a mixture of starch and protein.

21. A dough composition according to claim 17, wherein the amount of the heteropolysaccharide is from about 0.1 to about 0.5% by weight relative to the weight of the flour.

22. A dough composition according to claim 17, wherein the heteropolysaccharide is a crude composition having a hexose amount of not less than about 65% relative to the whole weight.

23. A dough composition according to claim 17 wherein the heteropolysaccharide is one produced by the incubation of *Achromobacter lactolyticus*.

24. A dough composition according to claim 17, wherein the heteropolysaccharide is one produced by the incubation of *Achromobacter lactolyticus* (ATCC No. 21473).

References Cited

UNITED STATES PATENTS 2,850,389   9/1958   Ofelt et al. _____ 99—90 P X
3,271,164   9/1966   Andt _____ 99—90 P RAYMOND N. JONES, Primary Examiner J. R. HOFFMAN, Assistant Examiner U.S. Cl. X.R.

99—90 P, 91, 92, 93, 150 R